(12) United States Patent
Torrey

(10) Patent No.: US 8,272,734 B2
(45) Date of Patent: Sep. 25, 2012

(54) NON-PROGRESSIVE MULTIFOCAL LENS WITH LARGE NEAR/INTERMEDIATE AREA

(75) Inventor: Jon Torrey, Portland, OR (US)

(73) Assignee: Essilor International, S.A., Charenton Cedex (FR)

( * ) Notice: Subject to any disclaimer, the term of this patent is extended or adjusted under 35 U.S.C. 154(b) by 188 days.

(21) Appl. No.: 12/699,473

(22) Filed: Feb. 3, 2010

(65) Prior Publication Data

US 2010/0149485 A1 Jun. 17, 2010

Related U.S. Application Data

(63) Continuation-in-part of application No. 10/990,358, filed on Nov. 16, 2004, now abandoned.

(51) Int. Cl.
 *G02C 7/06* (2006.01)
(52) U.S. Cl. .......... 351/159.43; 351/159.48; 351/159.73
(58) Field of Classification Search .......... 351/168–172, 351/175, 177, 159.41–159.49, 159.58, 159.59, 351/159.01, 159.73, 159.75, 159.76
See application file for complete search history.

(56) References Cited

U.S. PATENT DOCUMENTS

| | | | |
|---|---|---|---|
| 1,729,459 A | 9/1924 | Silge | 451/42 |
| 2,216,182 A * | 10/1940 | Boeder et al. | 351/170 |
| 2,310,925 A | 2/1943 | Bardwell et al. | 451/42 |
| 2,869,422 A | 1/1959 | Cretin-Maintenaz | 351/169 |
| 4,484,804 A | 11/1984 | Mignen | 351/168 |
| 4,575,946 A | 3/1986 | Bommarito | 33/200 |
| 4,690,524 A | 9/1987 | Daniels et al. | 351/168 |
| 5,430,504 A | 7/1995 | Muckenhirn et al. | 351/161 |
| 5,682,223 A | 10/1997 | Menezes et al. | 623/6.28 |
| 5,790,226 A | 8/1998 | Pollak | 351/54 |
| 5,847,802 A | 12/1998 | Menezes et al. | 351/161 |
| 2005/0057720 A1 | 3/2005 | Morris et al. | 351/159 |
| 2005/0237485 A1 | 10/2005 | Blum et al. | 351/168 |

OTHER PUBLICATIONS

International Preliminary Report on Patentability mailed on Feb. 23, 2007 in PCT/US05/40997.

* cited by examiner

*Primary Examiner* — Darryl J Collins
(74) *Attorney, Agent, or Firm* — Smith Moore Leatherwood LLP; Kimberly B. Gatling

(57) ABSTRACT

A non-progressive ophthalmic lens used in eye frames is provided with at least two distinct viewing areas. A very large lower area (lower relative to the face and eyes of the wearer) is provided with near to intermediate range vision correction prescription. A smaller, top portion of the lens is provided with distance range viewing correction prescription or zero power. In order to reduce image jump, the lenses are positioned such that the major axis of the base lens intersects and ends on the major axis of the supplementary lens, and both major axes lie in the same vertical plane. The two lens segments meet at a lined or blended intersection to minimize consumption of non-optically viewable space.

25 Claims, 3 Drawing Sheets

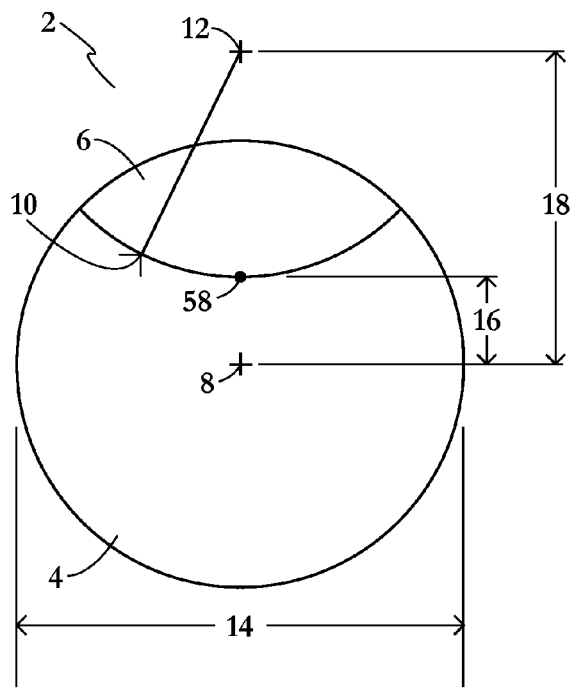
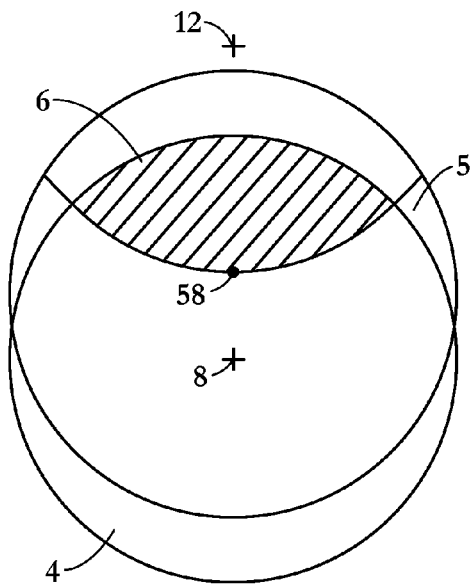
FIG. 1          FIG. 2
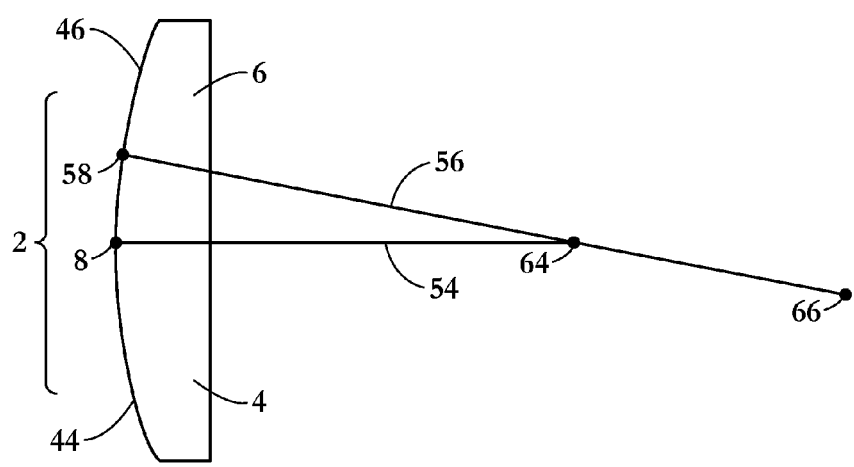
FIG. 3

NON-PROGRESSIVE MULTIFOCAL LENS WITH LARGE NEAR/INTERMEDIATE AREA

This application is a continuation-in-part of U.S. application Ser. No. 10/990,358, filed on Nov. 16, 2004 now abandoned.

BACKGROUND

The present invention relates to the field of ophthalmic lenses, particularly multifocal ophthalmic lenses, and multifocal ophthalmic lenses worn by persons tasking at close quarters to their work, such as computer operators.

The ability of an eye to switch focus from a distant image to a near image depends on the ability of the eye to change its shape. Specifically, certain structures of the eye, such as, for example, the lens, must change its shape or position so that proper focus of light on the retina is achieved. A number of these structures are under muscular control.

The shape of the lens is affected by muscular action. The lens is held in place behind the iris by zonules or suspensory ligaments, which attach to the wall of the eye at the ciliary body. When the ciliary muscles contract, tension on the zonules increases, which allows the lens to increase its curvature and assume a more spheric shape because of its elastic properties.

When light from a distant visual image enters the normal emmetropic eye with a relaxed ciliary muscle, the target is in focus on the retina. However, if the eye is directed at a nearby visual target, the light is initially focused behind the retina, i.e., the image at the retina is blurred, until accommodation occurs. The image is sharpened when the lens becomes thicker with a steeper central curvature because of contraction of the ciliary muscles, resulting in a decreased diameter across the lens as well as its suspensory connections to the wall of the eye via the zonular fibers which become relaxed, allowing the lens to achieve this more spherical shape as needed.

Accommodation refers to the ability of the eye to change its focus. Accommodation is measured by the accommodative amplitude, that is, the power, measured in units called diopters (D), that the lens can vary from the non-accommodative state to a full accommodative state. For example, in accommodation for near vision, the lens increases its curvature, and, as such, the amplitude of accommodation increases.

The lens continues to grow throughout an individual's lifetime. The rate of lens growth is usually about 20 to 30 microns per year. As such, the lens diameter increases over time and this increase has been correlated to a decrease in accommodative facility and thus, a decrease in the ability of the lens to focus on near images. The gradual loss of accommodative power with age means that individual's ability to focus on near images declines over time. When the near point of accommodation has receded beyond a distance comfortable for normal reading, the individual is said to have a condition called presbyopia.

Typically, individuals having presbyopia utilize ophthalmic lenses for correcting their vision. The amount of correction needed in the ophthalmic lenses varies depending upon the distance of the observed object. Commonly, presbyopia leads to individuals utilizing lenses having a double or triple focus (bifocal or trifocal lenses), or lenses wherein the focal distance progressively varies from one point of the lens to another (commonly called progressive lenses).

Even in individuals who have not developed presbyopia and have sufficient accommodative ability, extended periods of viewing at intermediate or near distances can fatigue the accommodative system, and cause symptoms such as eye strain, headaches, blurred vision, neck pain, and general discomfort. It has been found that non-presbyopes can experience relief from these symptoms by wearing lenses containing an appropriate amount of plus power, which in effect moves the individual's resting focus to the distance of the intermediate object, and lessens the need for accommodation to occur in the eyes themselves in order to see clearly. The exact amount of plus power needed to relieve symptoms varies by individual, but typically occurs in the range from +0.50 diopters to +1.50 diopters, over the individual's distance correction.

While presbyopes generally need different amounts of optical power to see clearly at intermediate and near distances, most non-presbyopes can function effectively with the addition of one power for both intermediate and near distances. Thus, when non-presbyopes utilize a lens for relieving the symptoms of extended near and intermediate work, there is little or no need for three separate zones of power in such lenses because two zones of power will suffice (one for distance viewing and one for both intermediate and near distances).

A significant disadvantage to the use of ophthalmic lenses for non-presbyopes, however, is image jump that occurs in bifocal lenses when the view is shifted from the intense near and intermediate viewing of a computer keyboard and screen, for example, to a more distant view. The difficulty is complicated when the individual has no need or little need of a prescription at one of the distinct distance areas of viewing.

SUMMARY OF THE INVENTION

A multifocal spectacle lens including a base lens dimensioned for near-to-intermediate range viewing, the base lens having a base lens major axis, and a supplementary lens dimensioned for distance range viewing, the supplementary lens having a supplementary lens major axis, wherein the base lens and the supplementary lens are positioned to form the spectacle lens such that the radius of the base lens major axis intersects and ends on the supplementary lens major axis. The base lens major axis and the supplementary lens major axis lie in the same vertical plane. The base lens may comprise about 60% to about 90% of the surface area of the spectacle lens. The supplementary lens may comprise about 10% to about 40% of the surface area of the spectacle lens. The supplementary lens may also comprise about 15% to about 40% of the surface area of the spectacle lens, about 15% to about 35% of the surface area of the spectacle lens, or about 20% to about 35% of the surface area of the spectacle lens.

The base lens includes near to intermediate range vision correcting prescription and the supplementary lens comprises distance range vision correcting prescription. In one embodiment, one of the base lens or the supplementary lens does not comprise any vision correcting prescription.

The supplementary lens is attached to the top area of the base lens such that the uppermost edge of the multifocal spectacle lens comprises the supplementary lens. The supplementary lens may be a lens segment applied over a surface of the base lens. The base lens and the supplementary lens may fit together within a spectacle frame. The base lens and the supplementary lens may be fused together at edges of each respective lens within a spectacle frame. The base lens and the supplementary lens may be adhesively secured together at edges of each respective lens within a spectacle frame.

In one embodiment, the base lens and the supplemental lens are blended together at edges of each respective lenses to form a blended area. The vertical distance of the blended area is about 1 mm to about 2 mm.

A method of providing multifocal spectacle lenses to a wearer includes the steps of selecting a base lens dimensioned for the wearer's viewing of near to intermediate images, selecting a supplementary lens dimensioned for the wearer's viewing of distance range images, positioning the supplementary lens at the top of the spectacle lens and the base lens at the bottom of the spectacle lens such that a radius of the major axis of the base lens intersects and ends on a major axis of the supplementary lens.

The positioning step further includes the step of aligning the major axis of the base lens with the major axis of the supplementary lens in the same vertical plane.

BRIEF DESCRIPTION OF THE FIGURES

The drawings referenced herein form a part of the specification. Features shown in the drawings are meant to be illustrative of some, but not all, embodiments of the invention, unless otherwise explicitly indicated, and implications to the contrary are otherwise not to be made. Although like reference numerals correspond to similar, though not necessarily identical, components and/or features in the drawings, for the sake of brevity, reference numerals or features having a previously described function may not necessarily be described in connection with other drawings in which such components and/or features appear.

FIG. 1 is a front view of a non-progressive, multifocal lens comprising a top distance power correction and a lower near to intermediate power correction according to an embodiment of the present invention.

FIG. 2 is a front view of the orientation of the lenses comprising the multifocal lens of FIG. 1.

FIG. 3 is a side view of a prescription orientation for the multifocal lens of FIG. 1.

DETAILED DESCRIPTION OF THE INVENTION

Figure 4:
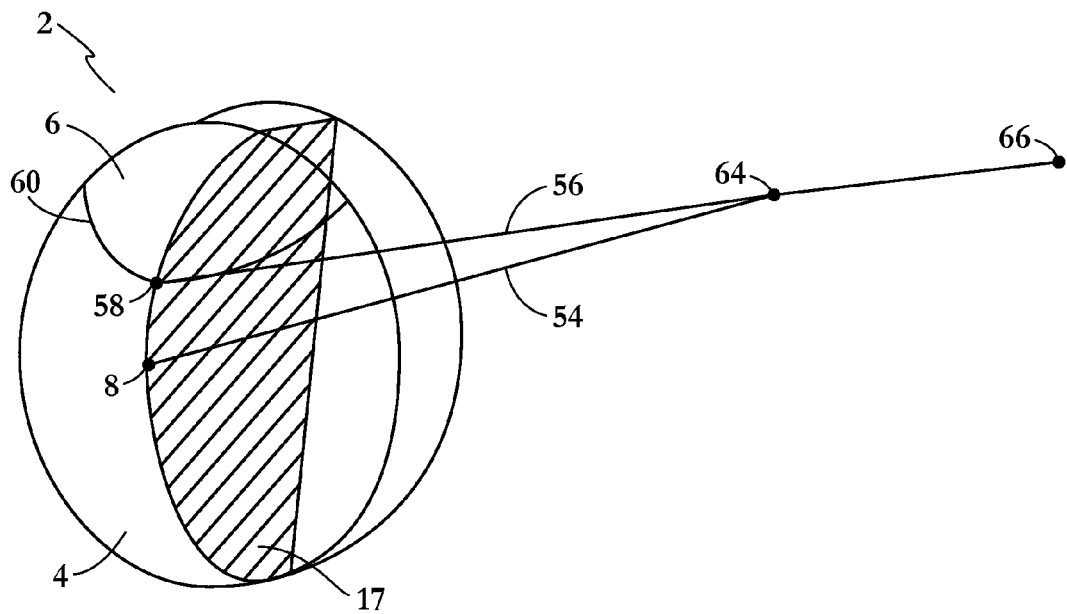
FIG. 4 is perspective view of a prescription orientation for the multifocal lens of FIG. 1.

In the following detailed description of exemplary embodiments of the invention, reference is made to the accompanying drawings that form a part hereof, and in which are shown by way of illustration specific exemplary embodiments in which the invention may be practiced. While these embodiments are described in sufficient detail to enable those skilled in the art to practice the invention, it will nevertheless be understood that no limitation of the scope of the present disclosure is thereby intended. Alterations and further modifications of the features illustrated herein, and additional applications of the principles illustrated herein, which would occur to one skilled in the relevant art and having possession of this disclosure, are to be considered within the scope of this disclosure. Specifically, other embodiments may be utilized, and other mechanical changes may be made without departing from the spirit or scope of the present invention. Accordingly, the following detailed description is not to be taken in a limiting sense, and the scope of the present invention is defined by the appended claims.

The present invention provides a multifocal lens that is particularly useful for non-presbyope wearers that spend significant amounts of time viewing images at near or intermediate distances, such as when working on a computer, and yet need the ability to transition to a more distant view at a different power to, for example, look at a presenter or object in the front of the room in which the wearer is working.

As shown in the Figures, the ophthalmic lens 2 of the present invention may be circular, with a center 8 and a diameter 14 of about 75 mm. The lens 2 has the majority of the viewing area in a base lens 4 for near to intermediate image viewing. Such base lens 4 may include a near to intermediate vision prescription or may not include any vision correcting prescription at all. At the very top of the viewing area of the lens 2 is a supplemental lens segment 6 for distance image viewing. Such supplementary lens segment 6 may include a distance vision prescription or may not include any distance correcting prescription at all. In any case, there is a difference in power (prescription) between the base lens 4 and the supplementary lens segment 6.

As shown in FIG. 2, which, for instructional purposes, depicts the entire supplementary lens 5 overlaid and raised by about 6 mm with respect to the base lens 4, the supplementary lens segment 6 is cut out from the supplementary lens 5. The geometric center 12 of the circular distance power lens segment 6 is shown in FIGS. 1 and 2 and may have a radius 10 of about 35 mm. It is noted that the geometric center 12 of the circular lens segment 6 is not the lens segment's 6 optical center 58, as explained further below.

Referring again to FIG. 1, for purposes of conveying an exemplary orientation of the base lens 4 and supplementary lens segment 6, the distance 18 between the centers 8, 12 of the circles of the two lens areas 4, 6 is shown, as well as the distance 16 between the lowest point 58 of the arc of the distance power area 6 and the center 8 of the circle defining the near to intermediate power area 4. The shapes and dimensions are specified for purposes of convenience and not for limitation of the practice of the invention.

There are a number of possible methods of designing the intersection of the powers on a multifocal, particularly bifocal, lens. However, in order to reduce or eliminate the image jump that occurs in prior art non-progressive bifocal lens designs when the view is shifted from the near to intermediate viewing portion to the distance viewing portion, one embodiment of the lens 2 of the present invention orients the two lenses 4, 6 such that the radius of the major axis of the base lens 4 intersects and ends on the major axis of the supplemental lens segment 6, as explained in more detail below.

All ophthalmic lenses are a combination of prisms, positioned either base to base or apex to apex. In a plus power, or magnifying lens, the prisms are positioned base to base, so the lens is thicker in the center than at the edges. The optical center is the point at which the prism surfaces "meet," and is the singular point in any lens where a ray of light can pass through the lens without being deviated. A ray of light passing through the optical center, perpendicular to a plane tangent at the optical center, defines the major axis of the lens.

Referring now to FIGS. 3 and 4, the surface 44 of the base lens 4 is determined by the radius of the major optical axis 54, centered about a center point 64. The surface 46 of the supplemental lens segment 6 is determined by the radius of the major optical axis 56, centered about a center point 66. The two surfaces 44 and 46 meet at a segmentation line 60. Point 58 is the lowest point of the arc formed by the supplementary lens segment 6 and is approximately 6 mm above the optical center 8 of the base lens 4. Point 58 is also the optical center of the supplementary lens segment 6, as shown in FIG. 2. The ledge height at point 58 can be varied during prototyping in order to find the offset between the two power areas that results in the most cosmetically appealing design. An exemplary result of this alignment is shown in FIG. 6 with the supplementary lens segment 6 over the lens 4 and a segmentation line 60 at the intersection of the lenses 4, 6.

Figure 5:
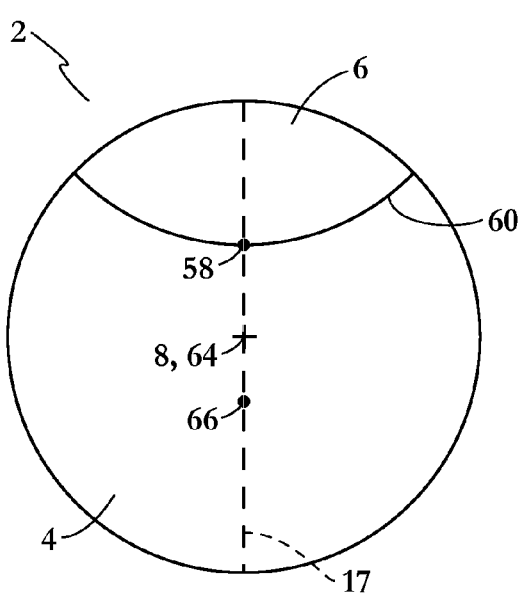
FIG. 5 is a front view of the prescription orientation for the multifocal lens of depicted in FIG. 4.

As shown in FIGS. 3 and 4, the major axis 54 of the base lens 4 and the major axis 56 of the supplementary lens segment 6 also lie in the same vertical plane. Specifically, the vertical slice 17 of the lens 2 depicted in FIG. 4 defines a vertical plane which, if viewed from the front of the lens 2 as shown in FIG. 5, encompasses the intersection point 58 of the lens surfaces 44, 46, the center point 64 of the base lens 4, the optical center 8 of the surface 44 of the base lens 4, and the center point 66 of the supplementary lens segment 6.

The wearer's normal viewing through the lens 2 is generally through the optical center 8 of the base lens 4. As the wearer gazes the eye upward, the line of vision reaches the intersection with the supplemental lens 6 at point 58. Because the major axis 54 of the base lens 4 is in the same vertical plane 17 as the major axis 56 of the supplementary lens segment 6, and the radius of the major axis 54 of the base lens 4 intersects and ends at the major axis 56 of the supplemental lens 6, the images in both lenses 4, 6 appear to the wearer to be joined, or continuous. Due to the change in magnification, there may be a slight difference in size of the viewed images, but there is no perceptible image jump, which would be a momentary viewing of double images that frequently happens with bifocal or trifocal lenses.

Figure 6:
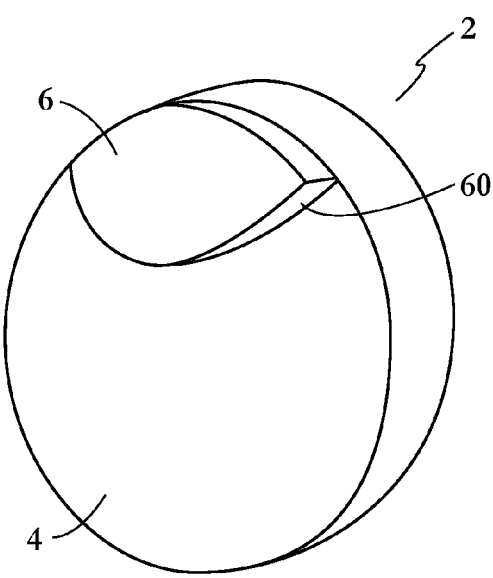
FIG. 6 is a perspective view of the multifocal lens of FIG. 1.
Figure 7:
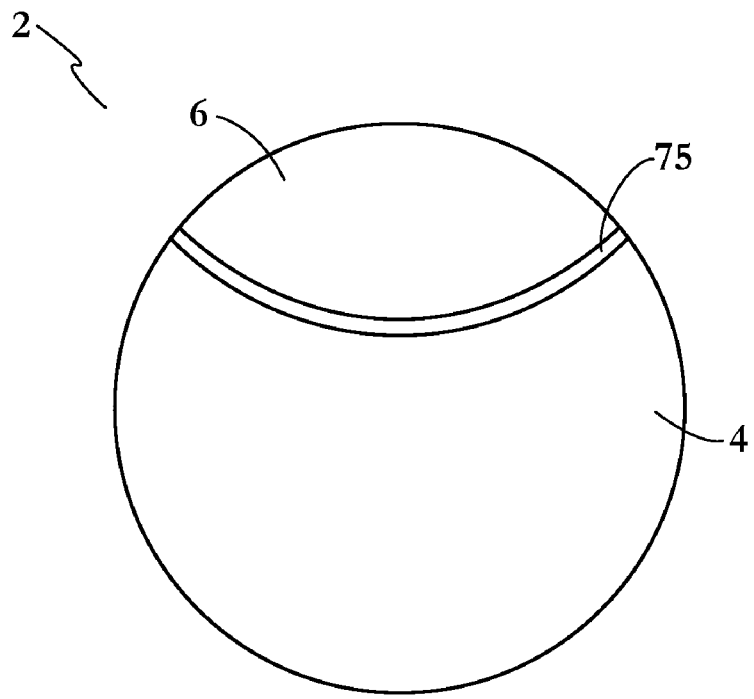
FIG. 7 is a front view of a non-progressive, multifocal lens comprising a top distance power correction, a lower near to intermediate power correction, and a blended area between the top distance power correction and lower near to intermediate power correction, according to an embodiment of the present invention.

In some cases, the wearer of a multifocal lens according to the present invention may desire a lens that is more cosmetically pleasing by blending the powers of the base lens and the supplementary lens rather than them meeting at a lined intersection 60, as shown in FIG. 6. Thus, in another embodiment of the present invention, as shown in FIG. 7, the lens 2 of the present invention may comprise a small area 75 that blends the powers of the base lens 4 and supplementary lens segment 6 so as to visually hide the intersection of the powers. Such blended area 75 may be approximately 1-2 mm in width so that very little optical viewing space is wasted. More specifically, it is desirable to minimize the space needed to blend the lenses 4, 6 because, unlike progressive multifocal lenses that include optically viewable lens space in the transition between lenses of different powers, when lenses of different powers are blended in a non-progressive manner, the blended area of the lens is not optically usable space. In the embodiment shown in FIG. 7 comprising the blended area 75, the orientation of the base lens 4 and the supplemental lens 6 is the same as the embodiment shown in FIGS. 2 and 3 wherein the radius of the major axis 54 of the base lens 4 intersects and ends on the major axis 56 of the supplementary lens segment 6.

Figure 8:
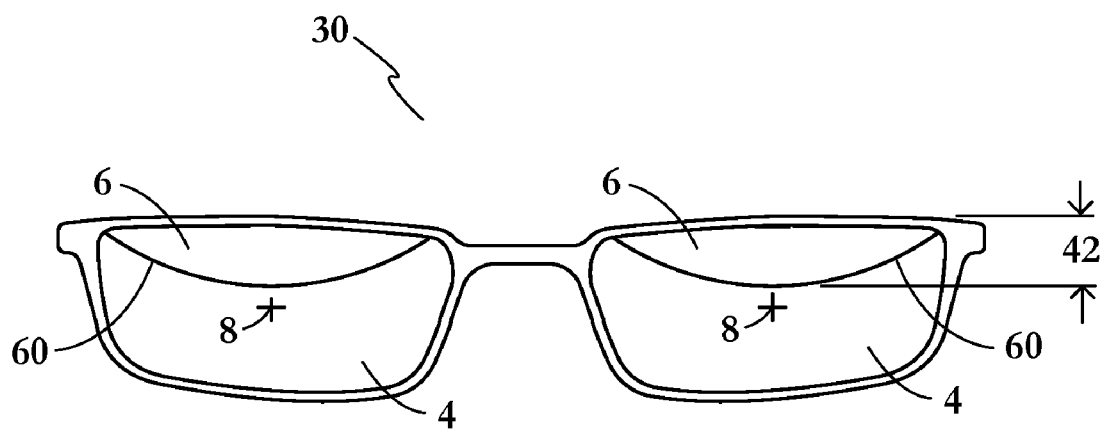
FIG. 8 is a front view of an eyeglass frame with two of the multifocal lenses of FIG. 1.

FIG. 8 shows an eyeglass set 30 comprising a frame 32 with two multifocal lenses 2 provided therein. Each lens 2 has a near to intermediate vision prescription area 4 and a distance vision correction prescription area 6. The two areas 4 and 6 are shown with a separation or segmentation line 60 that would be visible with non-progressive lenses not comprising any blending techniques (such as the blended area 75 described above with respect to FIG. 5). The fitting crosses 8 (which are the optical centers 8 of the respective base lenses 4) are also displayed. In one potential commercial embodiment, the change in dioptric power between supplementary lens segment 6 and base lens 4 is provided as standard amounts, or adds, of 0.50, 0.75, 1.00, 1.25 and 1.50, diopters. In this way, a reasonable number of power change options can be provided to the optometrist in order to prescribe for the needs of the vast majority of wearers. It is of course possible to provide an unlimited number of powers and corrective features, including cylindrical powers for the correction of astigmatism, in the various lens segments, but for commercial facility and potential off-the-shelf purchase, limiting the options for the amount of dioptric power change between the distance and intermediate/near prescriptions to the most common amounts is a simple approach. In the embodiment shown in FIG. 8, the vertical dimension 42 of the distance correction prescription area 6 is about 7 mm of the entire about 29 mm height of the base lens 4.

The percentage of the total area provided as the distance vision correcting area 6 may be varied among a range judged to be most suitable for the user. This is typically effected by vertical placement of the fitting cross 8 within the frame, by the optometrist or optician, during the fitting process. The distance correction area 6 may be less than about 40% of the total lens 2 area, less than about 35% of the total lens 2 area, or less than about 30% of the total lens 2 area. The area provided as the distance vision correcting area 6 may be greater than about 10% of the entire lens 2 area, greater than about 15% of the entire lens 2 area, or greater than about 20% of the entire lens 2 area. Working ranges of the percentage of total lens 2 surface area that acts as a distance correcting lens segment 6 in constructions for providing commercial lenses may include, for example, 10-40% distance/near to intermediate area, 10-35%, 15-35%, 15-30%, 10-30%, 20-35%, 20-30%, and 25-35%.

Any conventional or new lens materials can be used as the substance of the lens, including, but not limited to, certain classes of glass, polymers, thermoplastic polymers, thermoset or cured polymers, and the like. Suitable polymers include polycarbonate resin, polyester resins, polysulfone resins and polyacrylate resins. The lenses may be cast, injection molded, thermoformed, milled, laminated, ground or the like. Additional functionality may be provided in the lens structure and materials by known manufacturing techniques. For example, photochromic layers and properties may be provided, polarized layers and functions may be provided, tinted lenses may be provided, and the like, by known techniques.

The lens may be fit at the center pupil, which will provide the patients between approximately 5 and 7 mm (usually about 6 mm) of upward gaze movement before their view passes into the distance vision correcting area. In use, the wearer would spend the majority of time looking through the optical center 8 at the computer screen or at the reading material at the near or intermediate distance. Whenever the wearer needs to see at a distance, he or she simply tilts the head down and looks through the distance vision correcting area 6 at the top of the lens 2. This provides full distance vision to those who have the distance vision correcting prescription in the top of the lens 2. Even using a fixed selection of commercial prescriptions for the distance vision correcting area (e.g., the range indicated above or other sets of prescriptions that are provided), the majority of wearers can be assisted, and even if the prescription for the distance vision correction area 6 does not meet the strength of the wearer's normal prescription, at least some improvement is provided. Typical, but not exclusive ranges of specifications provided in the lenses could, by way of non-limiting examples, include a prescription range of −5.00 diopters to +7.50 diopters (measured at the fitting cross), base curves of 2.50, 5.50 and 8.00, the additional power areas of 0, +0.50 D, +0.75 D, +1.00 D, +1.25 D, +1.50 D and +1.75 D, and blank sizes of from 50-100 mm diameters, or even only 75 mm diameter.

While several embodiments have been described in detail herein, it will be apparent to those skilled in the art that the disclosed embodiments may be modified, such as the specific values, powers, materials, and shapes described in the foregoing disclosure. Therefore, the foregoing description is to be considered exemplary and is not intended to limit the invention to these embodiments. On the contrary, the invention is intended to cover alternatives, modifications and equivalents, which may be included within the spirit and scope of the invention as defined by the appended claims.

Furthermore, in the detailed description of the present invention, numerous specific details are set forth in order to provide a thorough understanding of the present invention. In other instances, well-known methods, procedures, components, and materials have not been described in detail as not to unnecessarily obscure aspects of the present invention. However, it will be recognized by one of ordinary skill in the art that the present invention may be practiced without these specific details.

What is claimed:

1. A multifocal spectacle lens comprising:
   a base lens dimensioned for near-to-intermediate range viewing, the base lens having a base lens major axis; and
   a supplementary lens dimensioned for distance range viewing, the supplementary lens having a supplementary lens major axis;
   wherein the base lens and the supplementary lens are positioned to form the spectacle lens such that the radius of the base lens major axis intersects and ends on the supplementary lens major axis.

2. The multifocal spectacle lens of claim 1 wherein the base lens major axis and the supplementary lens major axis lie in the same vertical plane.

3. The multifocal spectacle lens of claim 1 wherein the base lens comprises about 60% to about 90% of the surface area of the spectacle lens.

4. The multifocal spectacle lens of claim 1 wherein the supplementary lens comprises about 10% to about 40% of the surface area of the spectacle lens.

5. The multifocal spectacle lens of claim 1 wherein the supplementary lens comprises about 15% to about 40% of the surface area of the spectacle lens.

6. The multifocal spectacle lens of claim 1 wherein the supplementary lens comprises about 15% to about 35% of the surface area of the spectacle lens.

7. The multifocal spectacle lens of claim 1 wherein the supplementary lens comprises about 20% to about 35% of the surface area of the spectacle lens.

8. The multifocal spectacle lens of claim 1 wherein the base lens comprises near to intermediate range vision correcting prescription.

9. The multifocal spectacle lens of claim 1 wherein the supplementary lens comprises distance range vision correcting prescription.

10. The multifocal spectacle lens of claim 1 wherein one of the base lens or the supplementary lens does not comprise any vision correcting prescription.

11. The multifocal spectacle lens of claim 1 wherein the supplementary lens is attached to the top area of the base lens such that the uppermost edge of the multifocal spectacle lens comprises the supplementary lens.

12. The multifocal spectacle lens of claim 1 wherein the supplementary lens is a lens segment applied over a surface of the base lens.

13. The multifocal spectacle lens of claim 1 wherein the base lens and the supplementary lens fit together within a spectacle frame.

14. The multifocal spectacle lens of claim 1 wherein the base lens and the supplementary lens are fused together at edges of each respective lens within a spectacle frame.

15. The multifocal spectacle lens of claim 1 wherein the base lens and the supplementary lens are adhesively secured together at edges of each respective lens within a spectacle frame.

16. The multifocal spectacle lens of claim 1 wherein the base lens and the supplemental lens are blended together at edges of each respective lenses to form a blended area.

17. The multifocal spectacle lens of claim 16 wherein a vertical distance of the blended area is about 1 mm to about 2 mm.

18. A method of providing multifocal spectacle lenses to a wearer comprising:
   selecting a base lens dimensioned for the wearer's viewing of near to intermediate images;
   selecting a supplementary lens dimensioned for the wearer's viewing of distance range images; and
   positioning the supplementary lens at the top of the spectacle lens and the base lens at the bottom of the spectacle lens such that a radius of a major axis of the base lens intersects and ends on a major axis of the supplementary lens.

19. The method of claim 18 wherein the positioning step further comprises the step of aligning the major axis of the base lens with the major axis of the supplementary lens in the same vertical plane.

20. The method of claim 18 wherein the base lens comprises about 60% to about 90% of the surface area of the spectacle lens.

21. The method of claim 18 wherein the supplementary lens comprises about 10% to about 40% of the surface area of the spectacle lens.

22. The method of claim 18 wherein the base lens comprises near to intermediate range vision correcting prescription.

23. The method of claim 18 wherein the supplementary lens comprises distance range vision correcting prescription.

24. The method of claim 18 wherein one of the base lens or the supplementary lens does not comprise any vision correcting prescription.

25. The method of claim 18 further comprising the step of blending the respective edges of the base lens and the supplementary lens to form a blended area.

* * * * *